United States Patent [19]
Britt

[11] 3,779,216
[45] Dec. 18, 1973

[54] VARIABLE EXPLOSION-DISPLACEMENT ROTARY ENGINE

[76] Inventor: Robert Gordon Britt, 242 Connecticut Ave., Spartanburg, S.C. 29302

[22] Filed: June 5, 1972

[21] Appl. No.: 259,741

[52] U.S. Cl. .............................................. 123/8.49
[51] Int. Cl. ............................................. F02b 53/06
[58] Field of Search ................................... 123/8.49; 251/DIG. 3

[56] References Cited
UNITED STATES PATENTS

| | | | |
|---|---|---|---|
| 2,283,433 | 5/1942 | Gross | 123/8.45 |
| 2,547,560 | 4/1951 | Brodzinsky | 60/39.76 |
| 2,231,440 | 2/1941 | Fess | 123/8.49 |
| 1,090,021 | 3/1914 | Burton et al. | 123/8.49 |
| 2,224,443 | 12/1940 | Maurer et al. | 123/8.49 |
| 1,167,386 | 1/1916 | Crusius | 251/DIG. 3 |

FOREIGN PATENTS OR APPLICATIONS

| 1,361,236 | 4/1964 | France | 123/8.49 |
|---|---|---|---|

*Primary Examiner*—Al Lawrence Smith
*Assistant Examiner*—Michael Koczo, Jr.
*Attorney*—Solon B. Kemon, Carroll Palmer and William T. Estabrook

[57] ABSTRACT

A variable explosion-displacement rotary engine, free of a fuel compression cycle, and specifically designed for use with pollution free fuels of the alkyne type; and others, having a cylindrical rotor revolving in an elliptical opening of a housing to define two annular spaces on two sides therebetween. The rotor having radial members which project to follow without sealing the contour of the elliptical opening to form volume expanding combustion areas behind said members. High speed tungsten poppet valves mounted in the fuel input ports which extend into the combustion areas open and close via differential in pressures to admit fuel periodically between explosions, the engine providing four explosions in one shaft revolution. Ignition timing cooperating with the position of said members and the volume of fuel displaced controls the explosive force, the explosion displacement, engine torque and shaft revolutions per minute. The volume of fuel exploded is in direct proportion to the amount of horsepower required at any moment with the fuel-air mixture precisely fixed for complete combustion and pollution free exhaust.

9 Claims, 5 Drawing Figures

3,779,216

VARIABLE EXPLOSION-DISPLACEMENT ROTARY ENGINE

BRIEF SUMMARY OF INVENTION

This invention relates to the development of a variable explosion-displacement rotary engine having the advantages of greater efficiency and flexibility over those disclosed in the prior art.

The principal object of this invention is to provide an engine which is simple in construction, smooth running, relatively quiet in operation through the symmetrical balanced motion; eliminating the need for noise and shock suppressors, easy starting due to the absence of a compression cycle, having an elliptical opening in the housing to define two annular openings as displaced by a cylindrical rotor having two radial members which project to follow without sealing thereto the contour of the peripheral elliptical opening to form volume expanding combustion areas behind said rotating members, having high speed poppet valves disposed around the periphery of the combustion areas opening and closing via differential pressures to admit fuel in variable volumes proportional to the position of said members cooperating with the ignition timing positioned by the throttle linkage controlling the explosion combustion force, explosion displacement, shaft torque and revolutions per minute, which results in four complete combustion cycles per RPM and pollution free exhaust emissions.

BRIEF DESCRIPTION OF THE DRAWING VIEWS

Other objects, advantages and features should become apparent from the following disclosure wherein.

DETAILED DESCRIPTION

Figure 1:
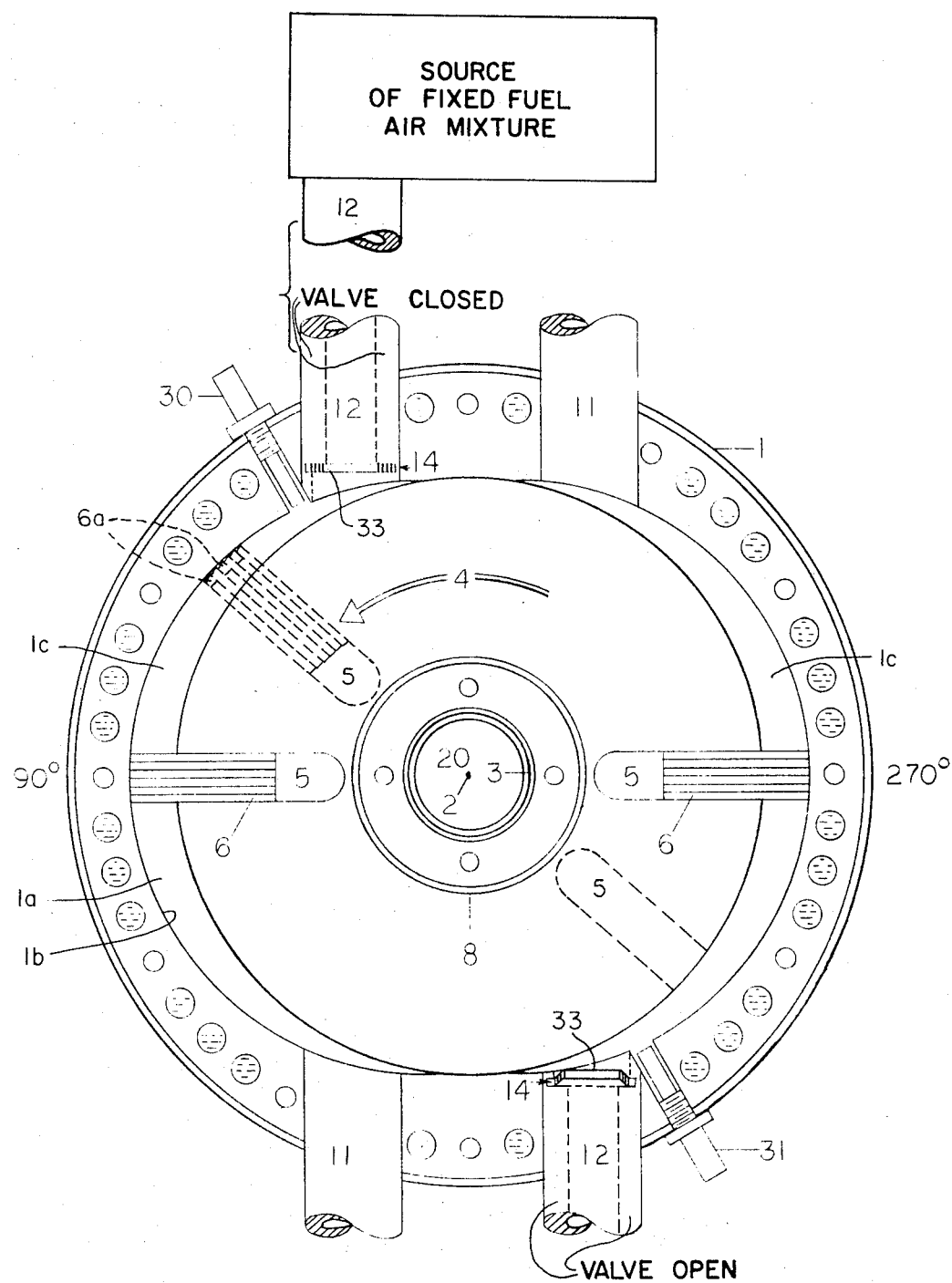
FIG. 1 is an elevational view of an engine unit constructed in accordance with the invention with an end cover thereof removed.
Figure 3:
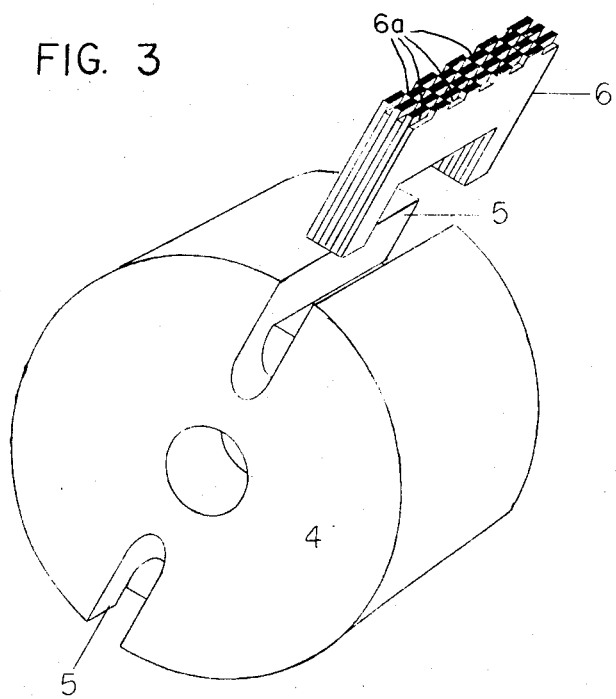
FIG. 3 is a perspective view of the rotor and diametrically opposed laminated blade assemblies as shown in FIG. 1.
Figure 5:
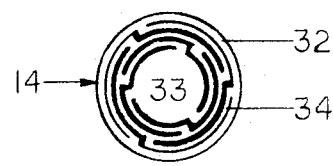
FIG. 5 is a plan view of the unique high cycle speed tungsten poppet valve.
Figure 2:
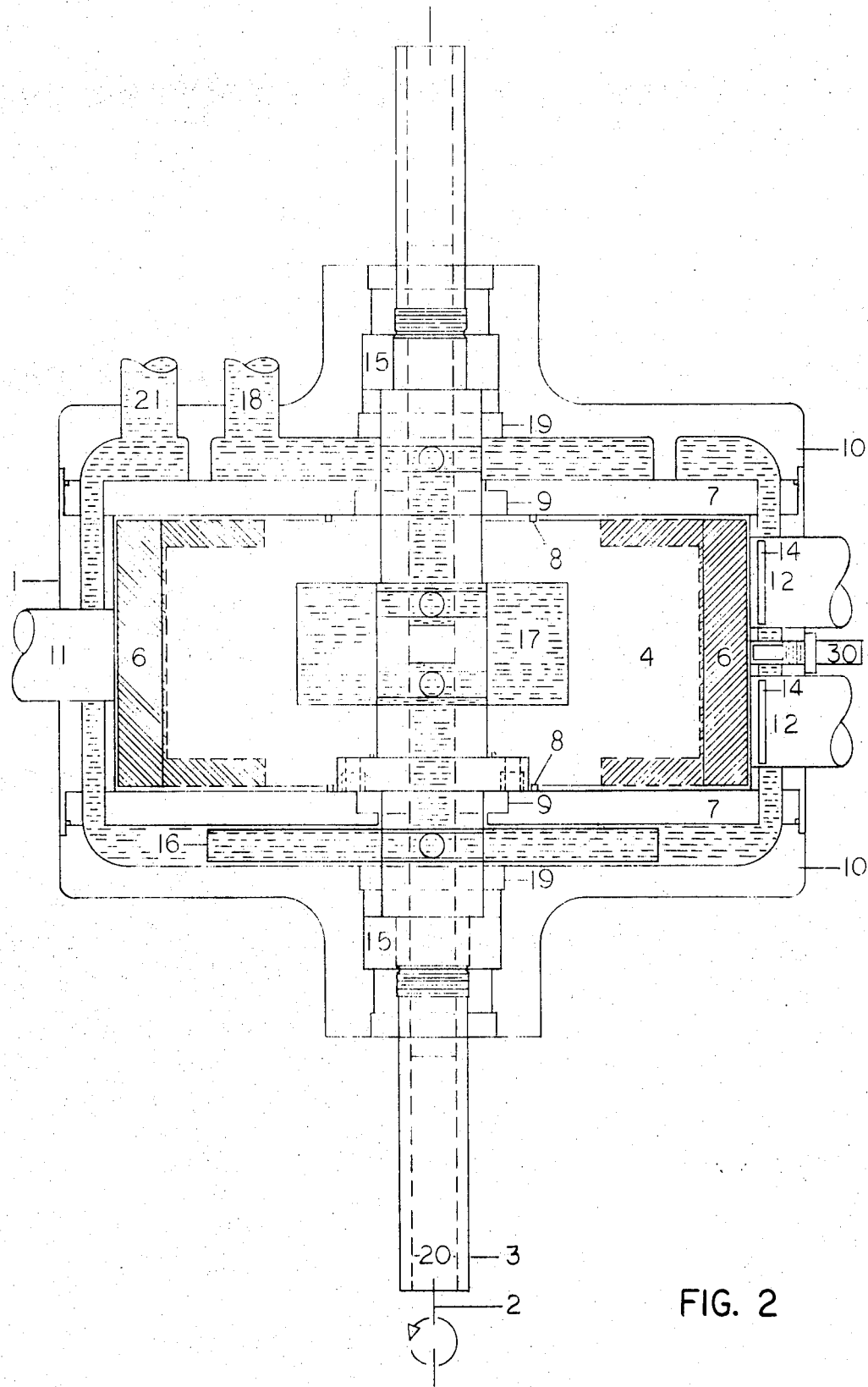
FIG. 2 is a side elevational view of the engine of FIG. 1.

Referring to FIG. 1, 2 and 3 of the drawings, the variable explosion-displacement rotary engine comprises a housing 1, which has an open space 1a therein defined by an at least partially elliptical wall 1b. An output shaft 3 is axially disposed in said space. A rotor 4 rotates about the axis 2 of the output shaft 3 while being concentrically mounted on the latter. The rotor 4 is in the shape of a cylinder which contains guide slots 5 in which two diametrically opposed laminated blades 6 move outward radially as via centrifugal force to bring the anti-friction edges grooved as shown at 6a in FIGS. 1 and 3 in contact with the inner elliptical surface of housing 1. The blades 6 do not seal against the elliptical inner wall 1b of the housing 1. A by-pass valve means is formed thereby which includes a plurality of stacked laminar blades having spaced passageways formed by the grooves 6a carried in staggered relationship from one blade to another. A by-pass of diminishing proportions is thus created between the blade and the surface 1b as the rotor rotates to move the blade for example, from a twelve o'clock to a nine o'clock position along the inner wall 1b of the elliptical chamber. The same effect occurs of course, as a blade is moved from a six o'clock to a three o'clock position as viewed in FIG. 1. A negative pressure is developed in the crescent shaped chamber formed behind the trailing edge of the blade to suck a fuel air mixture into that space through inlet ports 12 and valves 14. When the charge is ignited, the pressure becomes positive to close the inlet valve and force the rotor around to repeat the cycle. The above assemblies comprising parts 1, 2, 3, 4, 5, and 6 are contained by the two end plates 7, which contact metal "0" ring seals 8 on the rotor 4 which prevent combustion pressures from being imposed on the coolant seal 9 located in the center area of the end plates 7. The end bells 10, mounted via bolt circles along the perimeter, align into housing 1 and enclose end plates 7. Two exhaust ports 11 located in housing 1 are in a fixed open position. Four fuel input ports 12 located in housing 1 contain high speed tungsten poppet valves 14 of unique design that were developed for the engine; as shown in FIG. 5 more particularly. The shaft 3, supported by bearings 15, contains the coolant impeller 16. The coolant 17 enters coolant input port 18 and into the end bell 10, and between the coolant seals 9 and 19, and into radial holes in shaft 3 into shaft center bore 20, and into the turbine cavity via other radial shaft holes into opposite shaft center holes 20, via other radial shaft holes into coolant impeller 16, through the coolant pump impeller via centrifugal action into the other end bell 10, through the housing 1 perimeter bores, returning to the opposite end bell 10 and coolant output port 21. Two spark plugs 30 and 31 located in housing 1 between fuel input ports 12, provide ignition.

Figure 4:
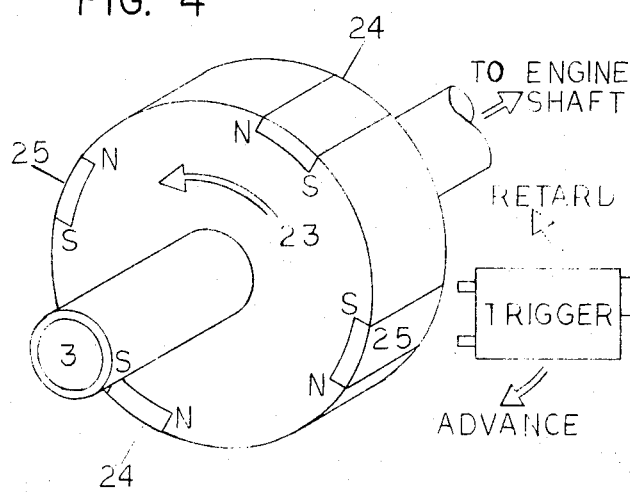
FIG. 4 is a block diagram of the ignition system.
Figure 4:
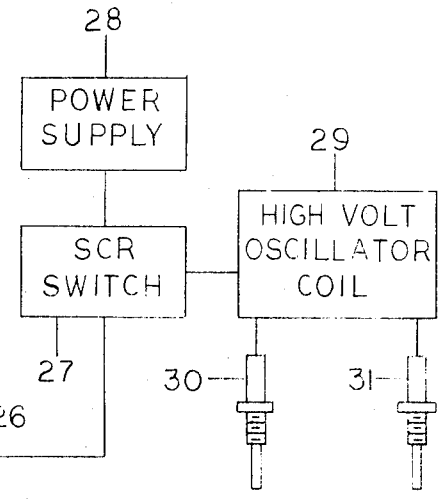

FIG. 4 is a perspective view and block diagram of the ignition system, including a timing drum 23 mounted securely to the output shaft 3, which contains two ignition switch-on magnets 25 and two ignition switch-off magnets 24, located on the perimeter of drum 23. Adjustable means include a trigger coil 26 movable about the axis 2 near the perimeter of drum 23, the movement and position of trigger coil 26 being controlled through suitable engine throttle linkage not shown. The trigger coil 26 is electrically connected to the SCR switch 27. SCR switch 27 is electrically connected to Power Supply 28 and high voltage oscillator coil 29. The high voltage oscillator coil 29 is electrically connected to the spark plugs 30 and 31. A unique high cycle speed tungsten poppet valve is illustrated in plan view in FIG. 5 and schematically in side elevation in FIG. 1 wherein; the outer ring 32 provides mounting and the center disc 33 functions to open and close fuel port 12. The flexible ribs 34 provide linkage between outer ring 32 and center disc 33, act as a fuel diffuser, and also provides the required spring action to keep center disc 33 normally closed against the opening of fuel ports 12.

In operation, and by reference to FIG. 1 in particular, the rotor 4 is rotated in the counter clockwise direction by a starter motor, crank, or like mechanism. As the blades 6 revolve within the elliptical center of housing 1, a reduction of pressure below atmospheric is effected in the volume expanding peripheral areas trailing the blades 6. This pressure differential causes the poppet valves 14 to open admitting the fuel-air mixture into the volume expanding periphral areas via the fuel input ports 12.

Referring now more particularly to FIG. 4, the trigger coil 26 has been positioned via the throttle linkage control to engage one of the ignition switch-on magnets 24 when the diametrically opposed blades 6 are positioned 90° and 270° midway between the fuel input ports 12 and exhaust ports 11. One of the switch-on magnets 24 having fluxed the trigger coil 26, closes SCR switch 27, energizes the high voltage oscillator coil 29 which is now providing a high tension arc at spark plugs 30 and 31. Spark plugs 30 and 31 ignite the fuel-air mixtures and the two diametrically opposed explosions close the poppet valves 14 blocking the fuel input ports 12 and stop fuel supply. The explosion pressure now imposed on the trailing sides of the diametrically opposed blades 6 effectively rotate the rotor 4 and shaft 3 through 180°. During the next 180° when the above cycle is being repeated, the leading side of the blades 6 force exhaust gases out of the engine through the exhaust ports 11. The switch-off magnets 24 located on the timing drum 23 function to magnetically reverse flux the trigger coil 26 and interrupt ignition between each 180° cycle.

There are four combustion explosions during each shaft revolution. The position of the ignition trigger coil 26 around the timing drum 23 ADVANCES or RETARDS ignition timing to provide engine throttle control. When the trigger coil 26 is moved toward ADVANCE timing position, the engine torque and revolutions per minute will decrease due to a reduction in the fuel volume displaced in cooperation with the new position of the blades 6 at the time of ignition, which results in a reduction in the explosive force transmitted to the blades 6 in direct proportion to the volume of fuel exploded. Moving the trigger coil 26 towards the RETARD position will increase engine torque and revolutions per minute due to an increase in the fuel volume displaced in cooperation with the new position of the blades 6 and the time of ignition, which results in an increase in the explosive force transmitted to the blades in direct proportion to the volume of fuel exploded.

The explosive forces impressed on the blades 6 are transmitted directly to the rotor 4 and directly from the rotor 4 to the shaft 3.

The fuel-air mixture from a suitable source (FIG. 1) is precisely adjusted for complete combustion of the gas and is permanently fixed in this position to provide pollution free exhaust emissions.

What has been set forth above is intended as exemplary to enable those skilled in the art in the practice of the invention. It should, therefore, be understood that, within the scope of the appended claims, the invention may be practiced other than as specifically described.

What is now and therefore desired to be protected by Letters Patent of the United States is:

1. A rotary engine comprising:
   a housing having an open space therein defined by an at least partially elliptical wall;
   a rotatable cylindrical rotor axially disposed within said space defining at least one substantially crescent shaped chamber;
   a radially movable blade means carried by said turbine rotor extending into contact with said wall for creating a low pressure in said crescent shaped chamber behind said blade means as said rotor is rotated in one direction;
   a source of combustible fixed fuel mixture;
   fuel intake means communicating with said source and with said crescent shaped chamber for introducing fuel into said crescent shaped chamber behind said blade means;
   exhaust means communicating with said crescent shaped chamber at a point spaced angularly from said intake means in the direction of rotation of said rotor;
   fuel ignition means positioned in communication with said crescent shaped chamber adjacent said intake means for burning the fuel therein creating a high pressure in said crescent shaped chamber;
   a valve carried by said fuel intake means for opening said fuel intake means responsive to a reduction in pressure in said crescent shaped chamber behind said blade means and closing said fuel intake means responsive to said high pressure in said crescent shaped chamber behind said blade means; and
   adjustable means for actuating said ignition means at selected positions of said blade in said crescent shaped chamber;
   whereby controlled volumes of a fixed fuel mixture may be ignited to meet varying power requirements.

2. The structure set forth in claim 1 including:
   a by-pass valve means effective at least during an initial portion of movement of the blade means through said crescent shaped chamber for reducing and thereby controlling said high pressure created behind said blade means.

3. The structure set forth in claim 2 wherein a pair of opposed crescent shaped chambers are defined in said housing, each such chamber having fuel intake means, exhaust means, a valve and fuel ignition means.

4. The structure set forth in claim 3 wherein said radially movable blade means includes:
   a plurality of stacked laminar blades having passageways spaced in staggered relationship in the outer edge of said blade from one blade to another forming said by-pass valve means;
   whereby a by-pass of diminishing proportions is created as said blade means moves through said crescent shaped chamber from a position near the minor axis of the elliptical wall toward the greater axis of the wall responsive to relative movement of the laminar blades with respect to each other as a result of their contact with the elliptical wall.

5. The structure set forth in claim 4 wherein said valve is poppet valve normally spring biased to close said fuel intake means.

6. A rotary engine comprising:
   a housing having an open space therein defined by an at least partially elliptical wall;
   a rotatable cylindrical rotor axially disposed within said space and defining at least one substantially crescent shaped chamber;
   a radially movable blade means carried by said rotor extending into contact with said wall for creating a low pressure in said crescent shaped chamber behind said blade means as said rotor is rotated in one direction;
   a source of a combustible fuel;
   fuel intake means communicating with said source and with said crescent shaped chamber for introducing fuel into said crescent shaped chamber behind said blade means;

exhaust means communicating with said crescent shaped means chamber ahead of said blade means;

fuel ignition means positioned in said crescent shaped chamber behind said blade means for burning the fuel therein creating a high pressure in said crescent shaped chamber behind said blade means; and a by-pass valve means effective at least during an initial portion of movement of the blade means through said crscent shaped chamber for reducing and thereby controlling said high pressure created behind said blade means.

7. The structure set forth in claim 6 wherein said radially movable blade means includes:

a plurality of stacked laminar blades having spaced passageways in staggered relationship from one blade to another forming said by-pass valve means;

said by-pass valve means having an opening of diminishing proportions as said blade means moves through an initial portion of said crescent shaped chamber responsive to movement of the blades with respect to each other as a result of their contact with the elliptical wall; and a poppet valve normally spring biases to close said fuel intake means.

8. In a rotary engine having a housing with an open space therein defined by an at least partially elliptical wall, a rotatable cylindrical rotor axially disposed within and space defining at least one substantially crescent shaped chamber; and a radially movable blade means carried by said rotor extending into contact with said wall for creating a low pressure in said crescent shaped chamber behind said blade means as said rotor is rotated in one direction;

a source of a fixed fuel mixture;

fuel intake means communicating with said source and with said crescent shaped chamber for introducing fuel into said crescent shaped chamber behind said blade means;

exhaust means communicating with said crescent shaped means chamber ahead of said blade means;

fuel ignition means positioned in said crescent shaped chamber behind said blade means for burning the fuel therein creating a high pressure in said crescent shaped chamber behind said blade means; and adjustable means for actuating said ignition means at selected positions of said blade in said crescent shaped chamber;

whereby controlled volumes of a fixed fuel mixture may be ignited to meet varying power requirements.

9. The structure set forth in claim 8, including:

a poppet valve carried adjacent said fuel intake means opening said fuel intake means responsive to said low pressure in said crescent shaped chamber behind said blade means and closing said fuel intake means responsive to said high pressure in said crescent shaped chamber behind said blade means.

* * * * *